United States Patent [19]
Weiblen et al.

[11] Patent Number: 5,646,347
[45] Date of Patent: Jul. 8, 1997

[54] SUSPENSION FOR MICROMECHANICAL STRUCTURE AND MICROMECHANICAL ACCELERATION SENSOR

[75] Inventors: Kurt Weiblen, Metzingen; Michael Offenberg, Tuebingen; Bernhard Elsner, Kornwestheim, all of Germany

[73] Assignee: Robert Bosch GmbH, Stuttgart, Germany

[21] Appl. No.: 521,942

[22] Filed: Aug. 31, 1995

[30] Foreign Application Priority Data

Sep. 3, 1994 [DE] Germany .......................... 44 31 478.7

[51] Int. Cl.$^6$ .................................................. G01P 15/125
[52] U.S. Cl. ........................................ 73/514.32; 73/514.38
[58] Field of Search ............................ 73/514.32, 514.38, 73/514.18, 514.24, 497, 514.29

[56] References Cited

U.S. PATENT DOCUMENTS

| | | | |
|---|---|---|---|
| 4,879,914 | 11/1989 | Norling | 73/514.29 |
| 5,331,853 | 7/1994 | Hulsing | 73/514.29 |

FOREIGN PATENT DOCUMENTS

WO92/03740  3/1992  WIPO.

OTHER PUBLICATIONS

Microsystem Technologies 90, 1st Int. Conference on Microsystems, Berlin, 10–13 Sep. 1990, Springer–Verlag, p. 529 ff. by Mohr et al., "Movable Microstructures Manufactured by the LIGA Process as Basic Elements for Microsystems".

*Primary Examiner*—John E. Chapman
*Attorney, Agent, or Firm*—Kenyon & Kenyon

[57] ABSTRACT

A suspension or an acceleration sensor having a suspension is proposed, by means of which a micromechanical structure or the acceleration sensor is anchored on a substrate. The suspension takes place by means of lever elements on which an equalizing beam acts. The lever elements are deformed by the stresses in the equalizing beam with respect to the substrate in such a way that the stresses in the microstructure with respect to the substrate are either compensated for or, alternatively, are converted from compressive stresses to tensile stresses or from tensile stresses to compressive stresses.

10 Claims, 1 Drawing Sheet

SUSPENSION FOR MICROMECHANICAL STRUCTURE AND MICROMECHANICAL ACCELERATION SENSOR

BACKGROUND INFORMATION

International Patent Application No. WO 92/03740 ("the '3740 application") describes an acceleration sensor which has a suspension and which is produced in surface micromechanical technology. In this acceleration sensor, the suspension is formed by suspending a bending element between two anchorage points which are anchored on a substrate. There is then attached to the bending element a seismic mass which, during an acceleration, applies a force action to the bending element in such a way that the bending element flexes. In such a suspension of the bending element between two anchorages, stresses may arise between the substrate and the bending element if the material of the bending element expands or contracts to a greater extent than the substrate in the course of the production process or as a result of temperature differences.

A paper by Mohr et al. (Microsystem Technologies 90, 1st Int. Conference on Microsystems, Berlin, 10–13 Sep. 1990, Springer-Verlag, page 529 ff.) describes a further method for the production of micromechanical components in surface micromechanical technology, which method is suitable for the production of suspensions and matching acceleration sensors.

SUMMARY OF THE INVENTION

The suspension according to the present invention and the acceleration sensor according to the present invention have the advantage that stresses in the bending elements can be adjusted. It is possible to suspend the structure in a stress-free manner or to convert compressive stresses into tensile stresses or tensile stresses into compressive stresses. The suspension according to the present invention consequently makes it possible to suspend any micromechanical structure in surface micromechanical technology with a defined stress. In the acceleration sensor having the suspension according to the present invention, the temperature dependence of the measurement signal is consequently reduced and the accuracy of the sensor increased.

DETAILED DESCRIPTION

Figure 1:
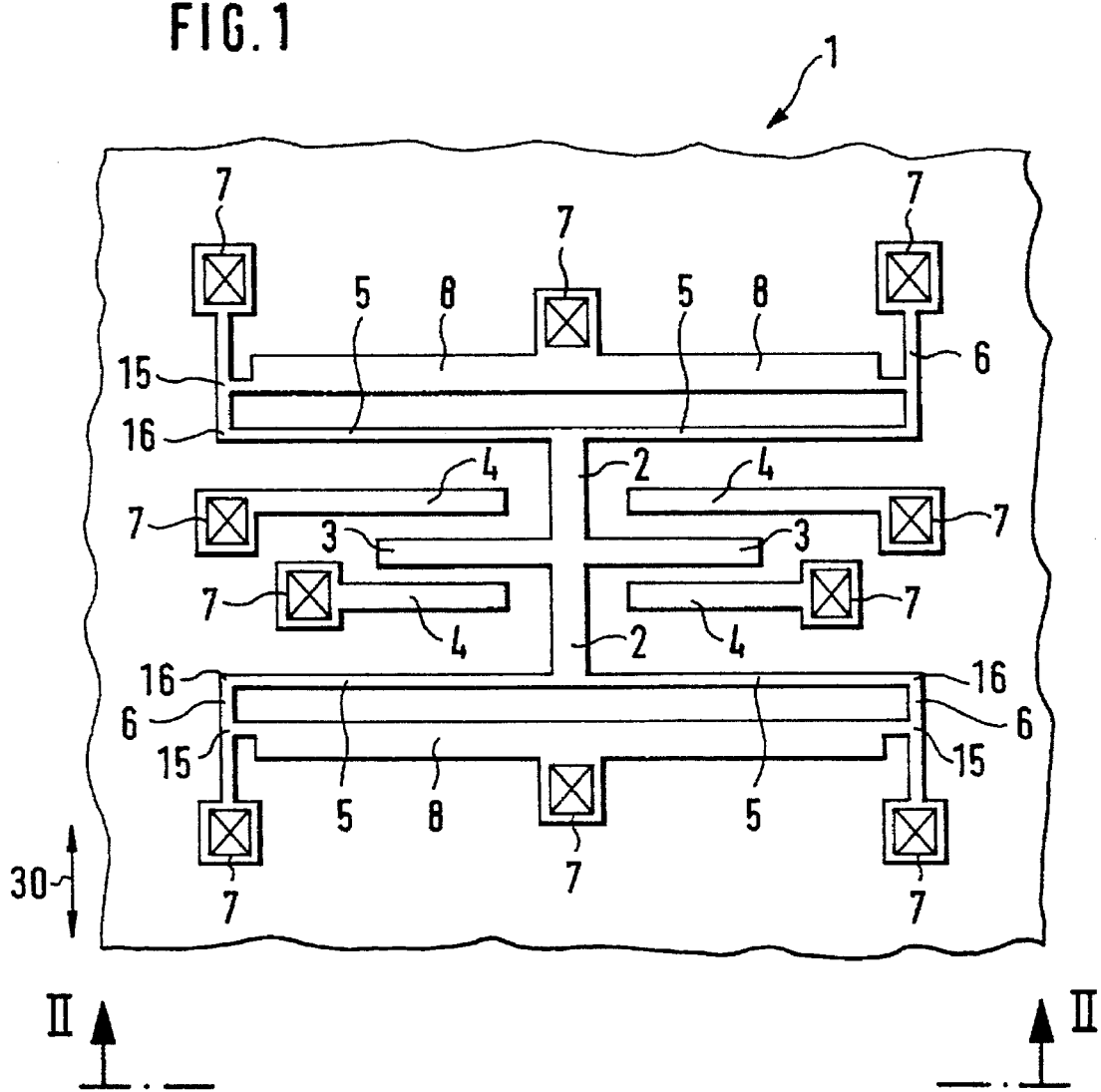
FIG. 1 shows a plan view of an acceleration sensor having the suspension according to the present invention.

FIG. 1 shows an acceleration sensor in which a seismic mass 2 is suspended on bending elements 5. During an acceleration along the axis indicated by the arrow 30, the force action of the seismic mass 2 on the bending elements 5 causes a deflection of the seismic mass 2. During this deflection of the seismic mass 2, the movable electrode 3 which is suspended on the seismic mass 2 is moved relative to the stationary electrodes 4. The movable electrode 3 and the stationary electrodes 4 form plate capacitors by means of which the acceleration can then be detected. This structure of the acceleration sensor described so far corresponds essentially to the structure of the acceleration sensor described in the '3740 application.

The bending elements 5 are attached to the substrate 1 by anchorages 7. The bending elements 5 are joined at both of their ends by means of lever elements 6 to the anchorages 7. Furthermore, an equalizing beam 8 is joined to the lever elements 6. The equalizing beam 8 is furthermore anchored to a central anchorage 7 on the substrate 1. The anchorages 7 are shown diagrammatically in order to facilitate the understanding of at which points the sensor is anchored on the substrate 1.

The equalizing beam 8 and the lever elements 6 provide a suspension for the bending elements 5 which makes it possible to control the stresses occurring in the bending elements 5 exactly. Such stresses may arise, for example, if the material for the bending elements 5 has a thermal expansion other than the material of the substrate and the bending elements 5 are anchored on the substrate at a temperature other than the normal operating temperature of the acceleration sensor. In the event of a temperature variation, the substrate 1 and the bending elements 5 contract differently and stresses are consequently generated.

The '3740 application describes the use of polysilicon as material for the acceleration sensor. If such polysilicon layers are doped, a certain expansion of the polysilicon layer and consequently the generation of compressive stresses with respect to the substrate 1 may arise under these circumstances.

To describe the mode of operation of the suspension, it is assumed below that the material for the bending elements 5 is under compressive stresses. If the bending elements 5 are rigidly clamped at their ends, as in the '3740 application, the compressive stresses in the bending elements 5 remain completely intact. This may influence the bending properties of the binding elements 5, and this may result in a nonlinear characteristic curve or a hysteresis in the characteristic curve of the sensor or may generate a temperature dependence. Particular problems are presented if the compressive stresses become so high that an Euler buckle arises. Some remedy is provided by joining the bending elements 5 to the anchorages 7 by means of lever elements 6. Since the lever elements 6 have an elasticity, the lever elements 6 are flexed by the compressive stresses in such a way that the compressive stresses in the bending elements 5 decrease.

However, not all of the compressive stresses can be eliminated by this measure alone. The equalizing beam 8 is provided for this purpose. The equalizing beam 8 is likewise joined to the lever elements so that it also transmits its compressive stresses to the lever elements 6. The lever elements 6 are consequently flexed further by the equalizing beam 8, which results in a further elimination of compressive stresses in the bending elements 5. Depending on the design of the lever elements 6, the compressive stresses in the material of the bending elements 5 and of the equalizing beam 8 may also be converted into tensile stresses in the bending elements 5 in this process. This is the case if the equalizing beam 8 acts on lever element 6 between the suspension 7 and the bending element 5.

The point of action of the equalizing beam 8 is denoted by 15 and the point of action of the bending elements 5 by 16. Depending on the distance of the two points of action 15 and 16 from the anchorage 7 of the lever element 6, a lever having a certain transmission ratio is generated. A small displacement of the point of action 15 can consequently achieve a greater displacement of the point of action 16. The compressive stresses in the bending element 5 can consequently be completely eliminated or, alternatively, converted into tensile stresses, if desired, by the relative position of the point of action 15 with respect to the point of action 16 An appropriate thickness of the equalizing beam 8 ensures that the force action caused by the equalizing beam 8 on the lever element 6 is sufficiently large.

The additional anchorage 7 in the center of the equalizing beam 8 can ensure that the compensation of the stresses takes place symmetrically with respect to the bending elements 5, thereby ensuring the linearity of the sensor. The additional anchorage of the equalizing beam is, however, not necessary in all cases.

The specific geometrical dimensions of the thicknesses of the bending elements 5, of the equalizing beam 8, of the lever elements 6 and the relative position of the points of action 15 and 16 must, if necessary, be determined empirically or by means of numerical calculations. The specific dimensions depend on the material of the microstructures and the desired stress ratios. Either a stress-free suspension or a conversion of compressive into tensile or tensile into compressive stresses can take place. Even if the above exemplary embodiment was described by reference to compressive stresses, it is suitable in exactly the same way for compensating for tensile stresses or converting them into compressive stresses.

The suspension according to the present invention has been described herein in connection with an acceleration sensor. In acceleration sensors, such suspensions are necessary to ensure that the measurement sensitivity of the sensor is not influenced by stresses in the bending elements 5. In principle, however, the proposed suspension is advantageous for any kind of micromechanical structures in which a stress-free suspension is to take place or in which defined tensile or compressive stresses are desired. Stresses between microstructure and substrate always occur if the microstructure is joined to the substrate at least two points. If a symmetrical construction of the microstructure is not desired, it is sufficient if the stresses at an anchorage 7 are influenced by a lever element 6 in conjunction with an equalizing beam 8.

Methods for the production of such sensors are described, for example, in the '3740 application or in the paper by Mohr cited at the outset. In general, however, such suspensions are applicable for all of the methods used in surface micromechanical technology. In these methods, the equalizing beam 8 is produced together with the bending elements 5 and is consequently composed of the same material and has the same stresses. Silicon or a metal is consequently suitable as a material for the sensor. However, other materials, such as, for example, glass or plastic material, which is likewise used in microtechnology, are also conceivable.

Figure 2:
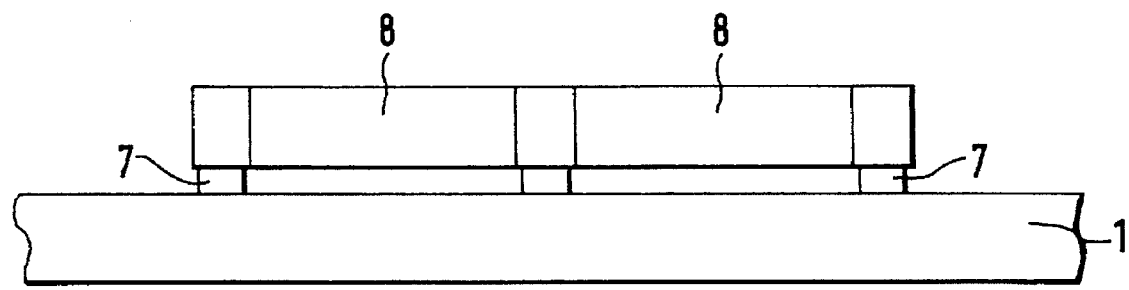
FIG. 2 shows a side view of the suspension shown in FIG. 1.

FIG. 2 shows a side view of the sensor according to FIG. 1 along the line II—II. The equalizing beam 8, which is anchored to the anchorages 7 on the substrate 1, is consequently shown. Apart from the central anchorage 7, the equalizing beam 8 is joined to the substrate 1 only by means of the lever element 6, with the result that the equalizing beam 8 can expand or contract in any desired way with respect to the substrate 1. The central anchorage of the equalizing beam 8 may also be omitted. The bending elements 5, the seismic mass 2, the lever elements 6 and the movable electrodes 3 are likewise joined to the substrate 1 only by means of suspensions 7 and are consequently able to move freely with respect to the substrate 1.

What is claimed is:

1. A device comprising:

a substrate;

a micromechanical structure;

a first anchorage mounted on the substrate;

at least one lever element, a first side of the lever element being attached to the first anchorage, and a second side of the lever element being attached to the micromechanical structure to form a first point of action; and an equalizing element for eliminating stresses on the micromechanical structure, the equalizing element being attached to the second side of the lever element to form a second point of action, the lever element being adapted to be flexed by a stress in the equalizing element.

2. The device according to claim 1, wherein the equalizing element includes a beam.

3. The device according to claim 1, further comprising:

a second anchorage mounted on the substrate, the second anchorage coupling the micromechanical structure to the substrate; and a second lever element, wherein a first side of the second lever element is attached to the second anchorage, and a second side of the second lever element is attached to the micromechanical structure to form a third point of action, the equalizing element is attached to the second lever element at a fourth point of action, and the second lever element is adapted to be flexed by a stress in the equalizing element.

4. The device according to claim 3, wherein:

the second point of action is between the first point of action and the first anchorage; and the fourth point of action is between the third point of action and the second anchorage.

5. A device comprising:

a substrate;

a micromechanical structure;

a first anchorage mounted on the substrate;

at least one lever element, a first side of the lever element being attached to the first anchorage, and a second side of the lever element being attached to the micromechanical structure to form a first point of action; and an equalizing element for eliminating stresses on the micromechanical structure, the equalizing element being attached to the second side of the lever element to form a second point of action, the lever element being adapted to be flexed by a stress in the equalizing element, wherein the micromechanical structure includes a seismic mass suspended on at least one bending element, the bending element is suspended by the lever element, and the seismic mass is adapted to be deflected by an acceleration, the device thereby functioning as an acceleration sensor.

6. The device according to claim 5, wherein the seismic mass includes at least one movable electrode arranged between at least two stationary electrodes, the stationary electrodes being attached to at least one additional anchorage.

7. The device according to claim 6, wherein the seismic mass, the movable electrode, the bending element, the lever element, and the equalizing element are composed of the same preselected material.

8. The device according to claim 7, wherein the preselected material includes silicon.

9. The device according to claim 7, wherein the preselected material includes a metal.

10. The device according to claim 5, wherein the equalizing element is adapted for adjusting tensile forces in the at least one bending element.

* * * * *